United States Patent [19]

White

[11] Patent Number: 5,074,592

[45] Date of Patent: Dec. 24, 1991

[54] VEHICLE SPRAY REDUCING APPARATUS

[75] Inventor: Kevin P. White, Arborfield, England

[73] Assignee: Latchworth Limited, London, England

[21] Appl. No.: 510,738

[22] Filed: Apr. 18, 1990

[51] Int. Cl.$^5$ .............................................. B62D 35/00
[52] U.S. Cl. ...................................... 280/851; 239/290
[58] Field of Search ................ 239/289, 290; 280/851, 280/848, 852; 180/903

[56] References Cited

U.S. PATENT DOCUMENTS

| 3,743,343 | 7/1973 | Grote, Sr. et al. ................. 280/851 |
| 4,486,046 | 12/1984 | Whitney et al. ................. 280/851 X |
| 4,585,242 | 4/1986 | Sparks ................. 280/851 X |
| 4,673,206 | 6/1987 | Kretschmer ................. 296/15 |
| 4,706,981 | 11/1987 | Dorwart ................. 239/290 X |

FOREIGN PATENT DOCUMENTS

| 0102776 | 3/1984 | European Pat. Off. . |
| 373569 | 5/1932 | United Kingdom ................. 280/851 |
| 1216429 | 12/1970 | United Kingdom . |
| 1526212 | 9/1978 | United Kingdom ................. 280/851 |

Primary Examiner—Andres Kashnikow
Assistant Examiner—Michael Mar
Attorney, Agent, or Firm—Robert W. J. Usher

[57] ABSTRACT

Spray reducing apparatus (14) for a vehicle comprises a duct (16) adapted to be disposed in front of a vehicle wheel (10) and arranged to collect air in a forwardly directed mouth (18). The air is directed through an exit (20) towards the ground in front of the wheel so as to deflect any surface water away from the path of the wheel.

One of such apparatus is arranged in front of each front wheel of the vehicle with the exit of the duct being disposed in the path of the vehicle wheel below the axle line thereof.

7 Claims, 3 Drawing Sheets

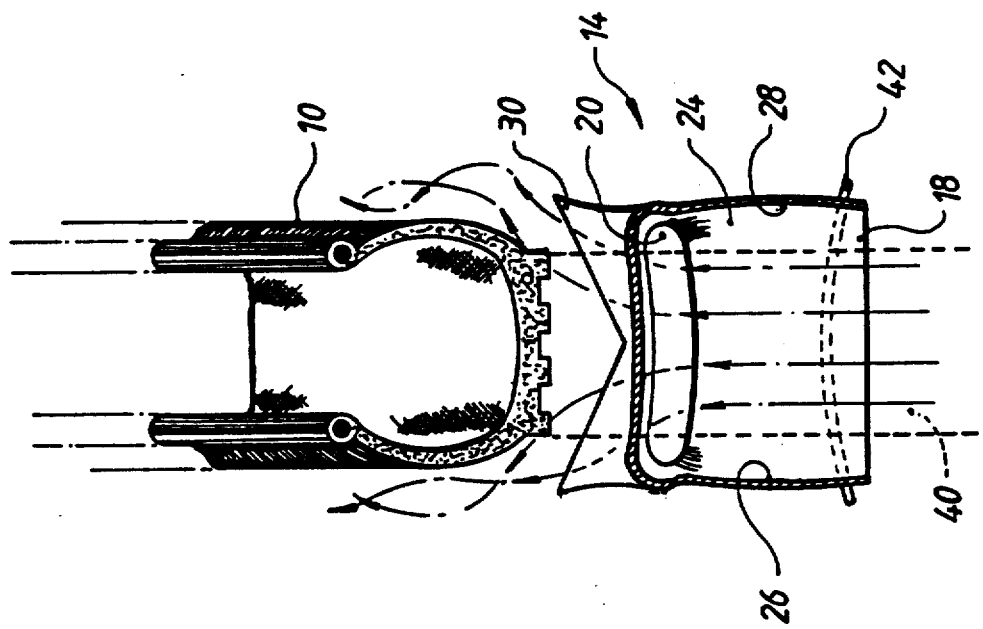
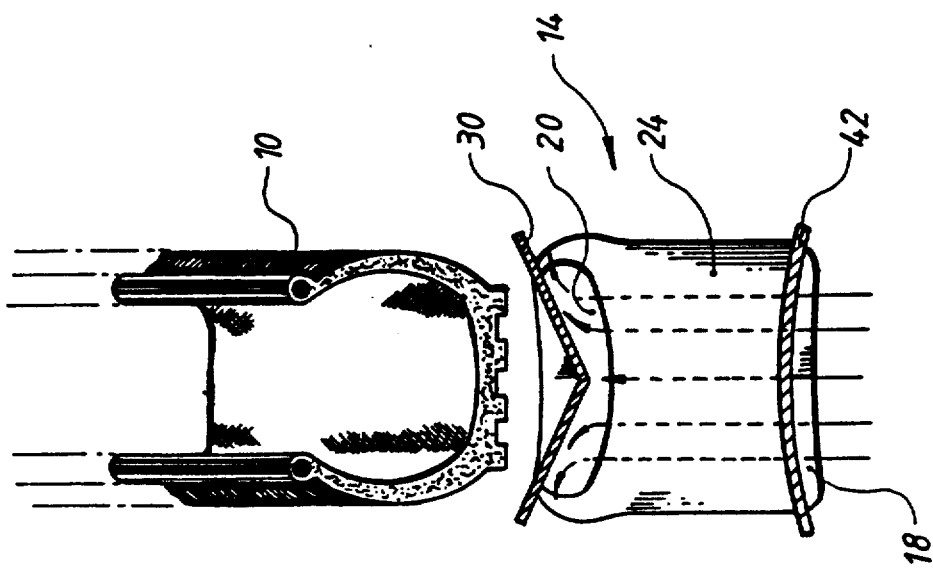

VEHICLE SPRAY REDUCING APPARATUS

This invention relates to a device for reducing spray produced by vehicles travelling on wet roads. This is a particular problem associated with large heavy vehicles travelling at relatively high speed on major roads such as motorways.

While vehicle manufacturers and good vehicle operators are as well aware of the problem as any one else, no solution has yet been proposed which works efficiently at reducing spray and is at the same time not prohibitively expensive to incorporate, either on new vehicles or existing ones.

Consequently other road users continue to suffer the effects, which can at times be highly dangerous, of spray thrown up by the wheels of heavy vehicles.

This is an object of the present invention to provide means to reduce spray produced in this way. The solution proposed is derived from the fact that, should surface water to be removed from the path of vehicle wheels, before the wheels follow that path, the root cause of spray will be removed. On top of this will be the added bonus of improved traction and reduced tendency of vehicle wheels to aqua-plane.

In accordance with a first aspect of this invention there is provided spray reducing means for a vehicle comprising a duct adapted to be disposed in front of a vehicle wheel and arranged to collect air in a mouth thereof and direct it through an exit thereof towards the ground in front of the wheel so as to deflect to one or both sides any surface water lying in the path of the wheel.

Said duct is preferably shaped to collect air and direct it towards the ground and to both sides of the wheel path.

Preferably a spoiler is provided under the mouth of the duct so as to deflect air which would otherwise pass under the duct and possible interfere with the downwardly directed air exiting said duct.

Preferably said duct is substantially tubular, the mouth being larger in frontal area than the exit. Preferably said tubular duct is curved between the mouth and exit, from a substantially horizontal attitude at the mouth end thereof to an inclined or substantially vertical attitude at the exit end thereof.

Preferably the mouth is substantially rectangular while the exit is flattened and curved to provide a stream of air which in section is essentially a shallow V-shape, the point of which is arranged towards the front of the vehicle.

Preferably the duct is arranged so that air exiting the duct and after hitting the ground is caused to form vortices to the sides of the following wheel which keep deflected water close to the ground.

The motive force for the air entering the duct is provided by the motion of the vehicle and the faster the vehicle is progressing, the more forcefully is air directed towards the ground to deflect surface water from the path of the following vehicle wheels. Thus the more likely the vehicle is to generate spray by its higher speed, the more likely surface water is to be completely removed from the vehicle wheel path.

Two such means would normally be provided, one for each front wheel of the vehicle. Rear wheels generally follow in the path of the front wheels, and so, if the paths of the front wheels are cleared, then this also has the effect of clearing the paths for following wheels.

In a second aspect of the present invention there is further provided a vehicle incorporating means according to the first aspect of the invention, one of such means being disposed in front of each front wheel of the vehicle with the exit of said duct being disposed in the path of the vehicle wheel below the axle line thereof.

The invention is further described hereinafter, by way of example only, with reference to the accompanying drawings, in which:

FIG. 3 is a second along the line III—III in FIG. 1; and,

FIG. 4 is a section along the line IV—IV in FIG. 1.

Figure 1:
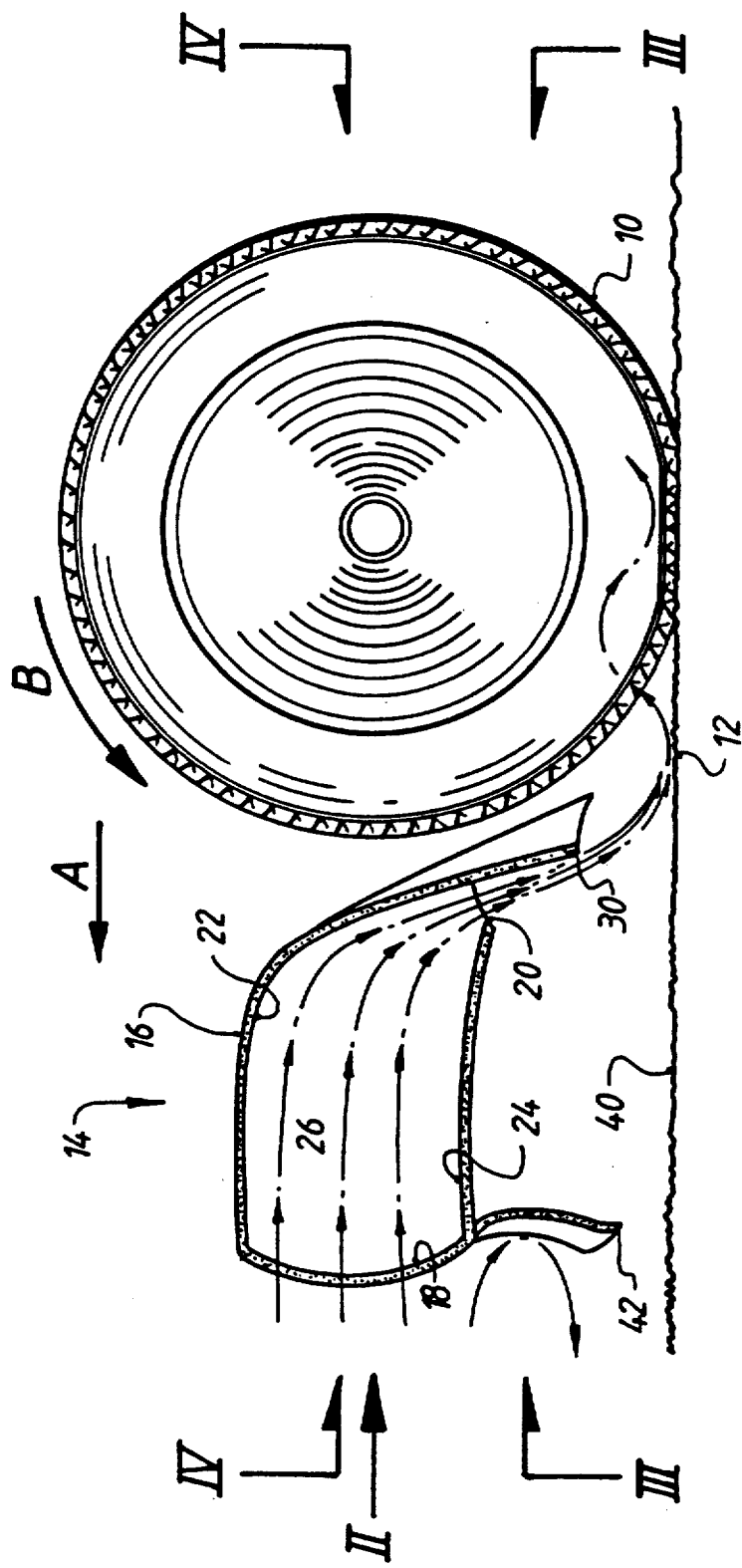
FIG. 1 is a side view of a vehicle wheel with, disposed in front thereof, spray reducing means in accordance with the first aspect of the invention, shown in section along the line I—I in FIG. 2.
Figure 2:
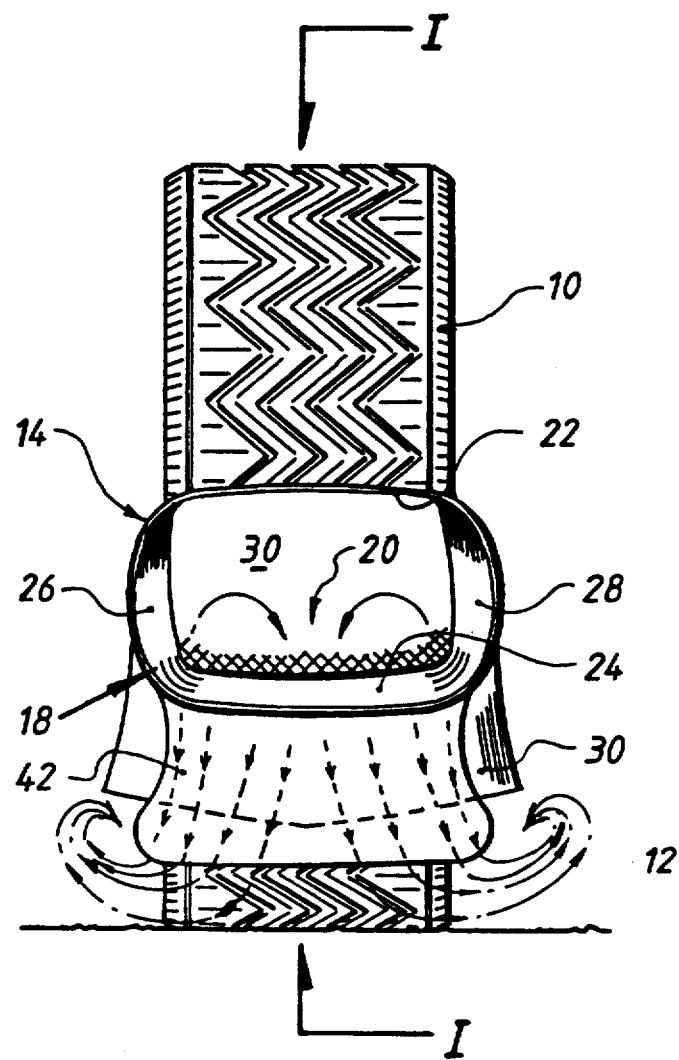
FIG. 2 is a view in the direction of the arrow II in FIG. 1.

In FIG. 1 a vehicle wheel 10 is shown moving in the direction of arrow A relative to the ground 12 and rotating in the direction of Arrow B. In front (that is to say, in the direction of travel) of the wheel 10 is disposed spray reducing means 14 in accordance with the first aspect of the present invention. The spray reducing means 14 comprises a duct 16 having a forwardly directed mouth 18 and a downwardly directed exit 20. The duct includes a top wall 22, bottom wall 24 and side walls 26,28 only one of which is visible in FIG. 1. The duct also has a rear wall 30 which is mostly responsible for the direction which air takes after entering the mouth 18 and leaving the exit 20. In this regard it will be understood that the bottom wall 24 could be found to be inessential to the operation of the spray reducing means. However, the bottom wall 24 does serve to compress and direct air entering the mouth 18.

The air enters mouth 18 by virtue of the motion of the vehicle (not shown) on which the spray reducing means 14 is mounted. The spray reducing means 14 is mounted on the vehicle as close as possible to the ground 12, although this need not be so close that it is likely to be damaged by obstructions on the ground. On existing vehicles, the spray reducing means might conveniently be fitted in front of the wheel arch of the vehicle in question while in new vehicles it is envisaged that the mouth 18 of the duct will be mounted in the vehicle bumper or thereabouts and consequently the duct 16 will be considerably longer than shown in the drawings.

The mouth 18 of the duct 16 can be any convenient shape such as substantially rectangular as shown. The exit 20 is however smaller than the mouth 18 and is preferably flattened to a sausage shape. Also the rear wall 30 and bottom wall 24 are shaped to give the exit 20 a shallow V-shape, with the point of the V forwardly directed. This has the effect of producing a flattened section of air moving and twisting towards the ground and forming vortices on either side of the wheel 10, generally represented by the dotted/dashed arrows in the drawings. These vortices are formed after any surface water has been deflected to the side of the vehicle wheel path 40 and serve to deep such deflected water close to the ground.

In the drawings, a spoiler 42 is shown fixed beneath the mouth 18. This has the effect of preventing air passing directly under the mouth 18 and duct 16 and interfering with air leaving the exit 20. It also has the effect of forming a relatively still region of air (with respect to the vehicle) behind the spoiler 42 and in front of the stream of air leaving the exit 20.

The rear wall 30 of the duct 16 is preferably also in the form of a shallow V-section as it depends downwardly from the exit 20. This maintains and increases the shape and direction of the air stream leaving the exit 20.

While the invention has been described with reference to specific elements and combinations of elements, it is envisaged that each element may be combined with any other or any combination of other elements. It is not intended to limit the invention to the particular combinations of elements suggested. Furthermore, the foregoing description is not intended to suggest that nay element mentioned is indispensable to the invention, or that alternatives may not be employed. What is defined as the invention should not be construed as limiting the extent of the disclosure of this specification.

What I claim is:

1. A spray reducing means attached to a vehicle for collecting air and directing the air towards the ground immediately in front of and in the path of a vehicle wheel, comprising a longitudinally extending duct having a forwardly directed mouth for receiving incoming air, a rearwardly and downwardly directed exit opening located adjacent the ground immediately in front of and in the path of the wheel, a bottom wall extending rearwardly from said mouth to a front edge of said exit opening, side walls extending rearwardly from said mouth to side edges of said exit opening, a top wall extending rearwardly from said mouth, a rear wall extending downwardly and rearwardly and having a bottom which forms a rear edge of said exit opening, and a curved wall portion merging the top wall with the rear wall, said curved wall portion being located forwardly of said rear edge, wherein the frontal area of said mouth is larger than said exit opening and said walls leading from said mouth to said exit opening form an unimpeded flow path to compress and direct all air entering the mouth and passing through said duct to said exit opening, said duct being shaped for directing air flow towards the ground directly in front of the wheel so as to deflect any surface water lying on the ground in the path of the wheel to at least one side of the wheel.

2. Spray reducing means according to claim 1, wherein the curved wall portion is located forwardly of said front edge of said exit opening.

3. Spray reducing means according to claim 1, wherein a spoiler is provided under the mouth of the duct so as to deflect air which would otherwise pass under the duct and possible interfere with the downwardly directed air exiting said duct.

4. Spray reducing means according to claim 1, wherein said mouth of the duct is substantially rectangular and the exit is substantially flattened and curved to provide a stream of air which in section is essentially a shallow V-shape, the point of which is arranged towards the front of the vehicle.

5. Spray reducing means according to claim 2, wherein said exit is essentially round in section and is arranged to direct air exiting therefrom towards the ground at an oblique angle to the ground and to the direction of travel of the vehicle.

6. Spray reducing means according to claim 1, wherein said duct is arranged so that air exiting the duct and after hitting the ground is caused to form vortices to the sides of the following wheel which keep deflected water close to the ground.

7. A wheeled vehicle according to claim 1, wherein a fender is provided at the front of the vehicle, and the mouth of said means is disposed in or below said fender.

* * * * *